US012699385B2

(12) United States Patent
Watanabe et al.

(10) Patent No.: US 12,699,385 B2
(45) Date of Patent: Aug. 4, 2026

(54) DEVICE AND METHOD FOR CORRECTING THERMAL DISPLACEMENT USING GENERATED DATA COLLECTION PLAN

(71) Applicant: FANUC CORPORATION, Yamanashi (JP)

(72) Inventors: Mitsunori Watanabe, Yamanashi (JP); Keita Hada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 351 days.

(21) Appl. No.: 18/254,385

(22) PCT Filed: Dec. 14, 2021

(86) PCT No.: PCT/JP2021/046078
§ 371 (c)(1),
(2) Date: May 25, 2023

(87) PCT Pub. No.: WO2022/131260
PCT Pub. Date: Jun. 23, 2022

(65) Prior Publication Data
US 2023/0418274 A1      Dec. 28, 2023

(30) Foreign Application Priority Data
Dec. 18, 2020     (JP) ................................. 2020-210351

(51) Int. Cl.
*G05B 23/02*          (2006.01)
(52) U.S. Cl.
CPC ................................. *G05B 23/0208* (2013.01)

(58) Field of Classification Search
None
See application file for complete search history.

(56) References Cited

U.S. PATENT DOCUMENTS

2013/0161183 A1*    6/2013  Leahey ............. H01J 37/32899
                                                    204/298.25
2016/0282844 A1     9/2016  Nomoto et al.
2019/0232441 A1*    8/2019  Yu ........................... B23B 3/162
                    (Continued)

FOREIGN PATENT DOCUMENTS

CN          1666161 A      9/2005
CN        106022552 A     10/2016
                    (Continued)

OTHER PUBLICATIONS

International Search Report in PCT/JP2021/046078, mailed Mar. 1, 2022, 2pp.

*Primary Examiner* — Bernard G Lindsay
(74) *Attorney, Agent, or Firm* — HAUPTMAN HAM, LLP

(57)          ABSTRACT

This data collection plan generating device generates a data collection plan including a combination of operating conditions for use when data are being acquired from an industrial machine that is operating. The data collection plan generating device: sets the specification of the industrial machine; extracts a constraining condition relating to an operation of the industrial machine; on the basis of the specification and the constraining condition, generates a plurality of operating conditions including a set of parameter values relating to the set specification; and generates and outputs a data collection plan from the generated operating conditions.

4 Claims, 6 Drawing Sheets

(56)        References Cited

U.S. PATENT DOCUMENTS

| | | | | |
|---|---|---|---|---|
| 2019/0294126 A1 | 9/2019 | Watanabe | | |
| 2020/0257261 A1 | 8/2020 | Koshiishi et al. | | |
| 2020/0285224 A1 | 9/2020 | Koshiishi et al. | | |
| 2020/0292506 A1* | 9/2020 | Hayzen | .............. | G01N 29/4454 |
| 2021/0302920 A1* | 9/2021 | Tamashima | ........ | G05B 19/0428 |
| 2021/0390369 A1 | 12/2021 | Hasegawa | | |
| 2021/0405617 A1* | 12/2021 | Obata | ................ | G05B 19/4155 |

FOREIGN PATENT DOCUMENTS

| | | | |
|---|---|---|---|
| CN | 111538296 A | 8/2020 | |
| CN | 111650892 A | 9/2020 | |
| CN | 111693282 A | 9/2020 | |
| JP | 2016189079 A | 11/2016 | |
| JP | 2019-012473 A | 1/2019 | |
| JP | 6453504 B1 | 1/2019 | |
| JP | 2019-166603 A | 10/2019 | |
| JP | 2020-064390 A | 4/2020 | |
| JP | 2020126430 A | 8/2020 | |
| WO | 2020184240 A1 | 9/2020 | |

\* cited by examiner

| | PARAMETER 1 | PARAMETER 2 | ... |
|---|---|---|---|
| ... | ... | ... | ... |
| OPERATING CONDITION i | ... | ... | ... |
| OPERATING CONDITION i+1 | ... | ... | ... |
| OPERATING CONDITION i+2 | ... | ... | ... |
| OPERATING CONDITION i+3 | ... | ... | ... |
| ... | ... | ... | ... |

FIG.8

| PURPOSE OF DATA COLLECTION | PARAMETER TO BE SELECTED | ... |
|---|---|---|
| ... | ... | ... |
| THERMAL DISPLACEMENT CORRECTION LEARNING | ENVIRONMENTAL TEMPERATURE, ROTATIONAL SPEED OF SPINDLE | ... |
| MACHINE TOOL COLLISION DETECTION LEARNING | AXIS POSITION, AXIS SPEED, AXIS ACCELERATION | ... |
| ... | ... | ... |

DEVICE AND METHOD FOR CORRECTING THERMAL DISPLACEMENT USING GENERATED DATA COLLECTION PLAN

RELATED APPLICATIONS

The present application is a National Phase of International Application No. PCT/JP2021/046078 filed Dec. 14, 2021, which claims priority to Japanese Application No. 2020-210351 filed Dec. 18, 2020.

TECHNICAL FIELD

The present invention relates to a data collection plan generating device and a data collection plan generating method for generating a data collection plan based on a combination of operating conditions in acquiring data from a machine in operation.

BACKGROUND ART

Industrial machines such as machine tools and robots are installed in a manufacturing site such as a factory. In the manufacturing site, a plurality of operators operate one or more above-mentioned industrial machines to manufacture products. Components which constitute the industrial machines expand or shrink due to heat generation, environmental temperature changes or similar caused by the operations of the components of the industrial machines. The expansion and shrinkage of the components of the industrial machines have an influence on positioning of moving elements of the industrial machines. In a case where precision motion is required of an industrial machine, e.g., when precision work is conducted or when part assembly is carried out by a robot, the position of a moving element is corrected according to a thermal state of the industrial machine. That is to say, it is necessary to correct thermal displacement. There is a method for correcting the thermal displacement that estimates an amount of correction by using machine learning on the basis of operation information acquired from an industrial machine, temperatures of the components of the industrial machine detected by a sensor or the like (ex. Patent Literature 1). This method for correcting the thermal displacement by machine learning is also well known.

When industrial machines keep operating at a manufacturing site, problems may occur in the operation of the industrial machines due to aging degradation of the components constituting the industrial machines, an external factor such as change in ambient temperature or vibration, incorrect setting made by an operator and so on. If it is determined that a problem has occurred in the operation of an industrial machine, an operator suspends the industrial machine having the problem, eliminates the cause of the problem, and then restarts the industrial machine to continue the operation.

The operation statuses including normal/abnormal statuses of the industrial machines are monitored by a management apparatus, for instance. The apparatus for managing the operation statuses of the industrial machines is configured to, for example, monitor time-series data such as position, speed and torque of a motor detected in each industrial machine via a network, data indicating a change in a signal at a predefined time and time-series data about such as a vibration, sound and dynamic image detected by a sensor attached to each industrial machine, and then detect changes in the passages of time of respective data to manage the operation statuses of the industrial machines (see ex. Patent Literatures 2 and 3). There is a method for determining the operation statuses of the industrial machines that is carried out based on a physical amount detected by a sensor and others in the industrial machines. A method using machine learning for the determination is well known.

As described above, machine learning is being utilized in various situations at manufacturing sites.

PRIOR ART DOCUMENT

Patent Literature

[Patent Literature 1] Japanese Patent Laid-Open Publication No. 2019-166603
[Patent Literature 2] Japanese Patent Publication No.
[Patent Literature 3] Japanese Patent Laid-Open Publication No. 2019-012473

SUMMARY OF THE INVENTION

Problems to be Solved by the Invention

In order to make a correction of thermal displacement, a determination of the operation statuses of the industrial machines and so on by utilizing a machine learning function, it is necessary to perform machine learning by using data collected from the industrial machines. Then, it is necessary to use data that can evenly cover the specification ranges of the industrial machines to generate a learning model, i.e., a good learning model that can be used for estimating a proper amount of thermal displacement correction and making an appropriate determination on the operation statuses of the industrial machines. Thus, in collecting data, the data collection needs to be conducted under various operating conditions so that the specification ranges of the industrial machines can be covered. However, if the number of data is increased too much for evenly covering the specification ranges, a man-hour required for development increases significantly. In particular, when a single data collection takes a long time, an enormous amount of the man-hours is required for development. That is to say, it is necessary to make a plan for collecting the data to cover the specification ranges of the industrial machines in just proportion by the collected data. Such problem occurs not only in machine learning but also in operation tests using other industrial machines, industrial systems or the like.

Thus, there is a demand for a mechanism that enables the generation of a suitable data collection plan for collecting appropriate data from general set values, such as functions and specifications of machines.

Means for Solving the Problem

An aspect of the present invention is a data collection plan generating device for generating a data collection plan formed of a combination of operating conditions for acquiring data from a machine in operation, including: a specification setting unit configured to set a specification of the machine; a constrain condition extracting unit configured to extract a constrain condition associated with an operation of the machine; an operation condition generating unit configured to generate a plurality of operating conditions including a set of values of parameters associated with the specification set by the specification setting unit on the basis of the specification and the constrain condition; a plan generating unit configured to generate a data collection plan from the operation conditions generated by the operation condition generating unit; and an output unit configured to output the data collection plan generated by the plan generating unit.

Another aspect of the present invention is a data collection plan generating method that is conducted by a data collection plan generating device for generating a data collection plan formed of a combination of operation conditions for acquiring data from a machine in operation, including: a specification setting procedure for setting a specification of the machine; a constrain condition extracting procedure for extracting a constrain condition associated with an operation of the machine; an operation condition generating procedure for generating a plurality of operating conditions including a set of values of parameters associated with the specification set in the specification setting procedure on the basis of the specification and the constrain condition; a plan generating procedure for generating a data collection plan from the operation conditions generated in the operation condition generating procedure; and an output procedure for outputting the data collection plan generated in the data collection plan generating procedure.

Effect of the Invention

The aspect of the invention enables the generation of a data collection plan suitable for collecting appropriate data from general set values such as functions and specifications of machines, and it is therefore expected that a stable improvement in performance of the machine learning function and a reduction in person-hours required for development can be achieved.

BRIEF DESCRIPTION OF THE DRAWINGS

FIG. 8 shows an example of selection rules.

MODE FOR CARRYING THE INVENTION

A description will now be made about an embodiment of the present invention along with the accompanying drawings.

Figure 1:
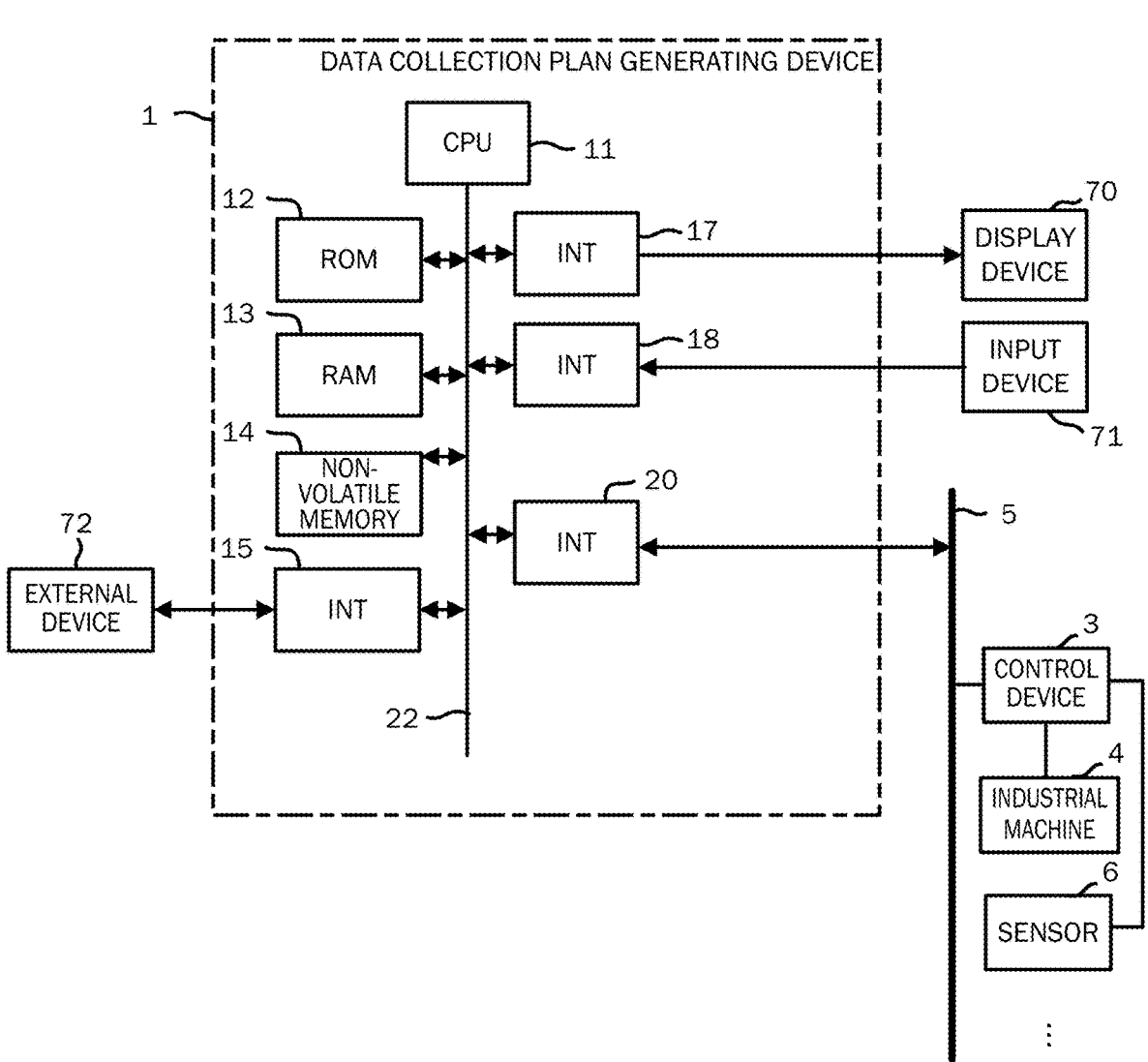
FIG. 1 is a schematic hardware configuration diagram of a data collection plan generating device according to an embodiment.

FIG. 1 is a schematic hardware configuration diagram showing the main part of a data collection plan generating device according to an embodiment of the invention.

A data collection plan generating device 1 of the invention can be implemented as, for example, a control device for controlling industrial machines, and furthermore can be implemented by a personal computer attached to a control device for controlling industrial machines in parallel, or on a personal computer, a cell computing system, a fog computing system or a cloud server, which is connected to the control device via a wired/wireless network. This embodiment shows the data collection plan generating device 1 implemented on a personal computer which is connected to the control device for controlling the industrial machines via a network.

The data collection plan generating device 1 according to this embodiment includes a CPU 11, the CPU 11 being a processor for controlling the entire data collection plan generating device 1. The CPU 11 is configured to read a system program stored in a ROM 12 via a bus 22 to thereby control the entire data collection plan generating device 1 in accordance with the system program. A RAM 13 is configured to temporarily store temporary computation data and pieces of data to be displayed, as well as various pieces of data input by an external device.

A non-volatile memory 14 is configured with a memory, SSD (Solid State Drive) or similar which is, for example, backed up by a battery (not shown). In the non-volatile memory 14, a state of storage of data written therein is retained even when a power source of the data collection plan generating device 1 is turned off. The non-volatile memory 14 can store, for example, pieces of data read from an external device 72 via an interface 15, pieces of data which is input via an input device 71, and pieces of data acquired from a control device 3 via an interface 20. The pieces of data stored in the non-volatile memory 14 may be deployed into the RAM 13 during executed/used. Furthermore, the ROM 12 is configured to prestore various system programs, such as known analysis programs.

The interface 15 is for connecting the CPU 11 in the data collection plan generating device 1 to the external device 72, such as a USB device. For example, pieces of data and others acquired by another industrial machine can be read from the external device 72. In addition to that, data and others processed in the data collection plan generating device 1 can be stored in external storing means (not shown) via the external device 72.

An interface 20 is for connecting the CPU 11 in the data collection plan generating device 1 with a wired or wireless network 5. To the network 5, the control device 3, a fog computing system, a cloud server or similar is connected so as to exchange pieces of data with the data collection plan generating device 1.

A display device 70 is configured to display various data read in the memory and pieces of data obtained by executing a program or others, which are output to be displayed via an interface 17, by way of example. In addition, the input device 71 including a keyboard, a pointing device and others and is configured to transfer commands in accordance with the operation by an operator, pieces of data and others via an interface 18 to the CPU 11.

Figures 2, 3:
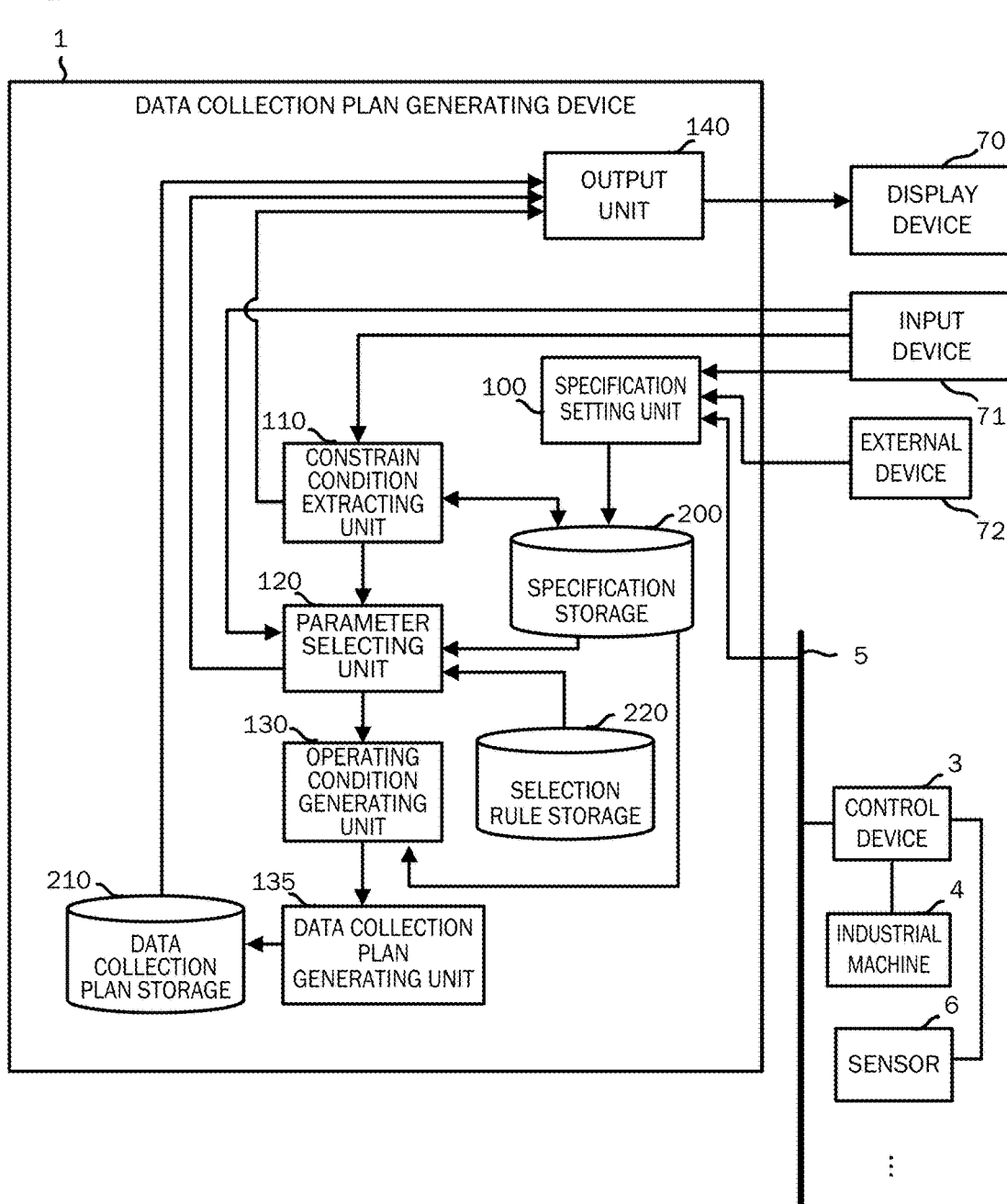
FIG. 2 is a schematic functional block diagram of the data collection plan generating device according to a first embodiment.
FIG. 3 shows an example of operating conditions.

FIG. 2 is a schematic block diagram showing functions of the data collection plan generating device 1 according to the first embodiment of the invention.

The functions of the data collection plan generating device 1 according to this embodiment are actualized in such a way that the CPU 11 included in the data collection plan generating device 1 shown in FIG. 1 executes a system program to thereby control an operation of each component of the data collection plan generating device 1. The data collection plan generating device 1 according to the embodiment includes a function of generating a data collection plan suitable for collecting appropriate data from general set values, such as functions and a specification of a machine to be operated. The embodiment presents an example of generating a data collection plan for correcting thermal displacement of a machine tool by using machine learning. Alternatively, the data collection plan generating device 1 of the embodiment can be applied for determining an operation status of the machine by using machine learning, by way of example.

The data collection plan generating device 1 of the embodiment includes a specification setting unit 100, a constraint condition extracting unit 110, a parameter selecting unit 120, an operating condition generating unit 130, a data collection plan generating unit 135 and an output unit 140. In addition to that, the RAM 13 and the non-volatile memory 14 in the data collection plan generating device 1 are previously provided with a specification storage unit 200 serving as an area for storing data about set specifications acquired from such as the input device 71, the external device 72, the control device 3 and others, a data collection plan storage unit 210 serving as an area for storing data on a generated data collection plan of the machine, and an elected rule storage unit 220 serving as an area for storing beforehand rules for selecting parameters as operating conditions.

The functions of the specification setting unit 100 is actualized in such a way that the CPU 11 included in the data collection plan generating device 1 shown in FIG. 1 executes a system program read from the ROM 12 to primarily perform computation processing by the CPU 11 with the RAM 13 and the non-volatile memory 14 and input control processing by the interface 15, 18 or 20. The specification setting unit 100 is configured to acquire and set information of a specification about the operation of the industrial machine 4 to be controlled by the control device 3. The information of the specification may be information specifying a predetermined range of parameters related to the operation of the machine, such as a moving range of each axis, the maximum moving speed of each axis, the maximum rate of moving acceleration of each axis, the maximum torque of each axis, the maximum load, the maximum rotational speed of a spindle, a maximum torque of the spindle, maximal flow of a coolant, the maximum temperature of the coolant, and the minimum temperature of the coolant, or information specifying a predetermined range of the data about an operation environment of the machine, such as the maximum ambient temperature and the minimum ambient temperature, by way of example. The information related to the specification may be information stored in the control device 3 or in a fog computing system, cloud server or others, not shown, or may be read from the external device 72. Furthermore, the operator may be allowed to set the information through the input device 71, if necessary. The data acquired by the specification setting unit 100 is stored in the specification storage 200.

The constrain condition extracting unit 110 is actualized in such a way that the CPU 11 included in the data collection plan generating device 1 shown in FIG. 1 executes the system program read from the ROM 12 to primarily perform the computation processing by the CPU 11 with the RAM 13 and the non-volatile memory 14. The constrain condition extracting unit 110 is configured to extract constrain conditions related to the operating conditions of the machine from the specification set by the specification setting unit 100 and other information input from the input device 71 by the operator. The constrain condition extracting unit 110 may extract the maximum value and the minimum value of a parameter of the operation of each machine as constrain conditions based on, for instance, the information about the specification set by the specification setting unit 100. The constrain condition extracting unit 110 may extract the maximum value and the minimum value of the data about the operation environment of each machine as constrain conditions based on, for instance, the information about the specification set by the specification setting unit 100. The constrain conditions may be a list of possible values of the predefined parameters or the operation environment, information indicating distribution or a conditional expression that adds a constrain to a relation between predefined parameters. The constrain condition extracting unit 110 may urge the operator to input such as a limitation on the operation associated with the size of the machine, a limitation on a continuous operating time or a limitation on the number of operations, so as to extract the constrain conditions based on the information thus input from the input device 71. The constrain condition extracting unit 110 may extract information about a typical rotational speed of the spindle, a rotation time of the spindle and others as constrain conditions from a processing program to be executed by the control device 3, by way of example. The constrain conditions extracted by the constrain condition extracting unit 110 are stored together with the information about the specification in the specification storage 200.

The parameter selecting unit 120 is actualized in such a way that the CPU 11 included in the data collection plan generating device 1 shown in FIG. 1 executes the system program read from the ROM 12 to primarily perform the computation processing by the CPU 11 with the RAM 13 and the non-volatile memory 14. The parameter selecting unit 120 is configured to select a parameter as a target to generate the operating condition of the machine. The parameter selecting unit 120 may cause the display device via the output unit 140 to display the parameters selectable as the operating condition of the industrial machine 4 based on, for example, the specification set by the specification setting unit 100, and thus allows the operator to select a parameter from the parameters as the operation condition of the industrial machines 4. In addition to that, the parameter selecting unit 120 may permit the operator to select a parameter as the operating condition of the industrial machine 4 by the selection rules stored in the selection rule storage unit 220 for a purpose concerning the operating condition of the industrial machine 4, by way of example. In such a case, as illustrated in FIG. 8, the selection rule storage unit 220 stores beforehand selection rules associated with a list of parameters to be selected for the purpose of data collection. The parameter selecting unit 120 presents the purpose of data collection included in the selection rules to the display device 70 and thus allows the operator to select this purpose, thereby facilitating the selection of an appropriate parameter. As to the parameter to which the specification is set by the specification setting unit 100, the parameter selecting unit 120 does not have to be provided if all operating conditions are selected. In such a case, the data collection plan generating device 1 that does not include the parameter selecting unit 120 can fully have the effect of the invention.

The operating condition generating unit 130 is actualized in such a way that the CPU 11 included in the data collection plan generating device 1 shown in FIG. 1 executes the system program read from the ROM 12 to primarily perform the computation processing by the CPU 11 with the RAM 13 and the non-volatile memory 14. The operating condition generating unit 130 is configured to generate the operating conditions of the industrial machine 4. As illustrated in FIG.

3, each operating condition generated by the operating condition generating unit 130 includes a set of parameter values selected by the parameter selecting unit 120.

The data collection plan generating unit 135 is actualized in such a way that the CPU 11 included in the data collection plan generating device 1 shown in FIG. 1 executes the system program read from the ROM 12 to primarily perform the computation processing by the CPU 11 with the RAM 13 and the non-volatile memory 14. The data collection plan generating unit 135 is configured to generate a data collection plan suitable for collecting appropriate data from the industrial machine 4. More specifically, the data collection plan generating unit 135 generates a combination of the operating conditions to be used for data collection such that, in a vector space of vectors elements of which are the parameters included in the operating conditions, the parameter values included in each of the operating condition are distributed uniformly in the vector space.

To uniformly distribute the operating conditions, for example, the data collection plan generating unit 135 may defines, for each parameter included in the operating conditions, values at predefined intervals between the minimum value and the maximum value of the each parameter to thereby generate a set of the defined values as a data collection plan.

Figure 4:
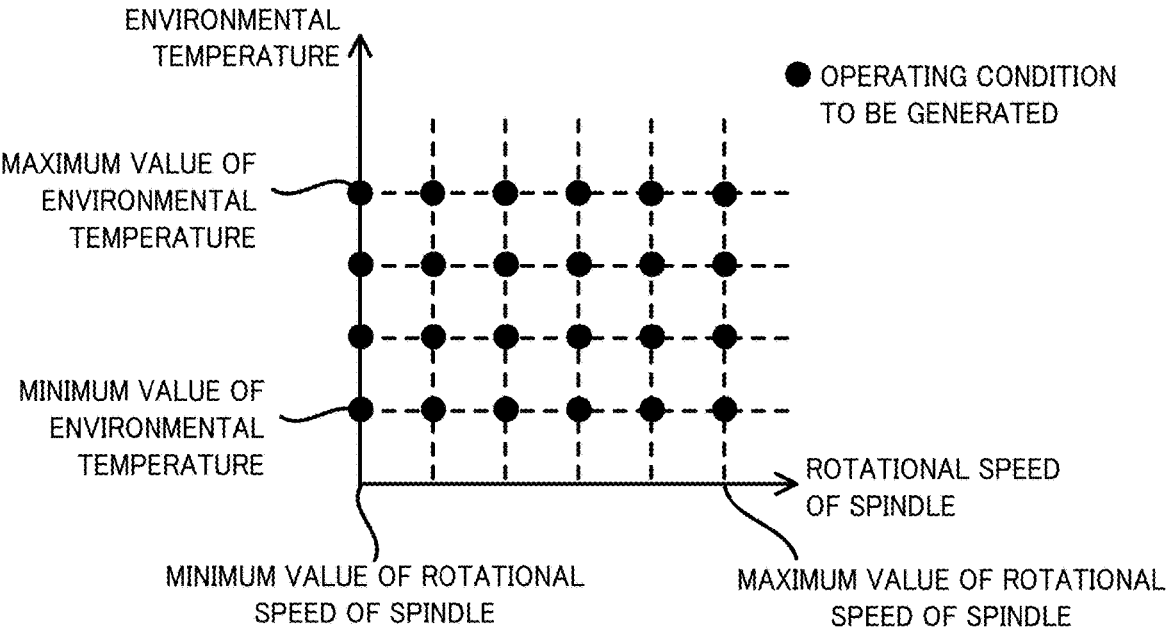
FIG. 4 illustrates a method for generating the operating conditions conducted by an operating condition generating unit in the data collection plan generating device shown in FIG. 2.

FIG. 4 shows an example of the generation of a data collection plan by selecting an environmental temperature and a rotational speed of a spindle as parameters in order to collect data to be used for learning that is appropriate for performing machine learning on a machine learning device that predicts a value for thermal displacement correction. The example in FIG. 4 defines values at predefined intervals between the minimum value and the maximum value for each of the environmental temperature and the rotational speed, so as to generate a set of the defined values as a data collection plan.

To uniformly distribute the operating conditions, for example, the data collection plan generating unit 135 may define, for each parameter included in the operating conditions, values at predefined intervals between the minimum value and the maximum value of a physical quantity associated with the each parameter, so as to generate a set of the defined values as a data collection plan.

Figure 5:
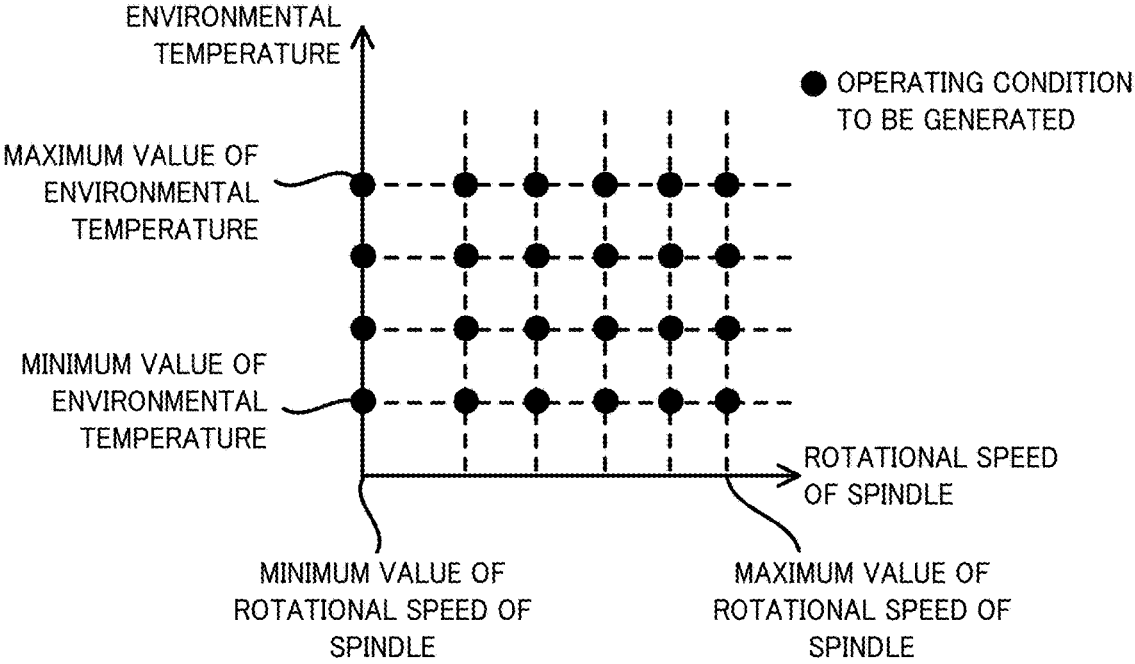
FIG. 5 illustrates another method for generating the operating conditions conducted by the operating condition generating unit.

FIG. 5 shows, as with FIG. 4, an example of the generation of a data collection plan by selecting the environmental temperature and the rotational speed of the spindle as parameters in order to collect data to be used for learning that is appropriate for performing machine learning on a machine learning device that predicts a value for thermal displacement correction. The example in FIG. 5 defines values at predefined intervals between the minimum value and the maximum value for the environmental temperature, and as to the rotational speed of the spindle, defines values of the rotational speed of the spindle such that amounts of heat generated from the spindle are at predefined intervals, thereby generating a set of the defined values as a data collection plan.

Figure 6:
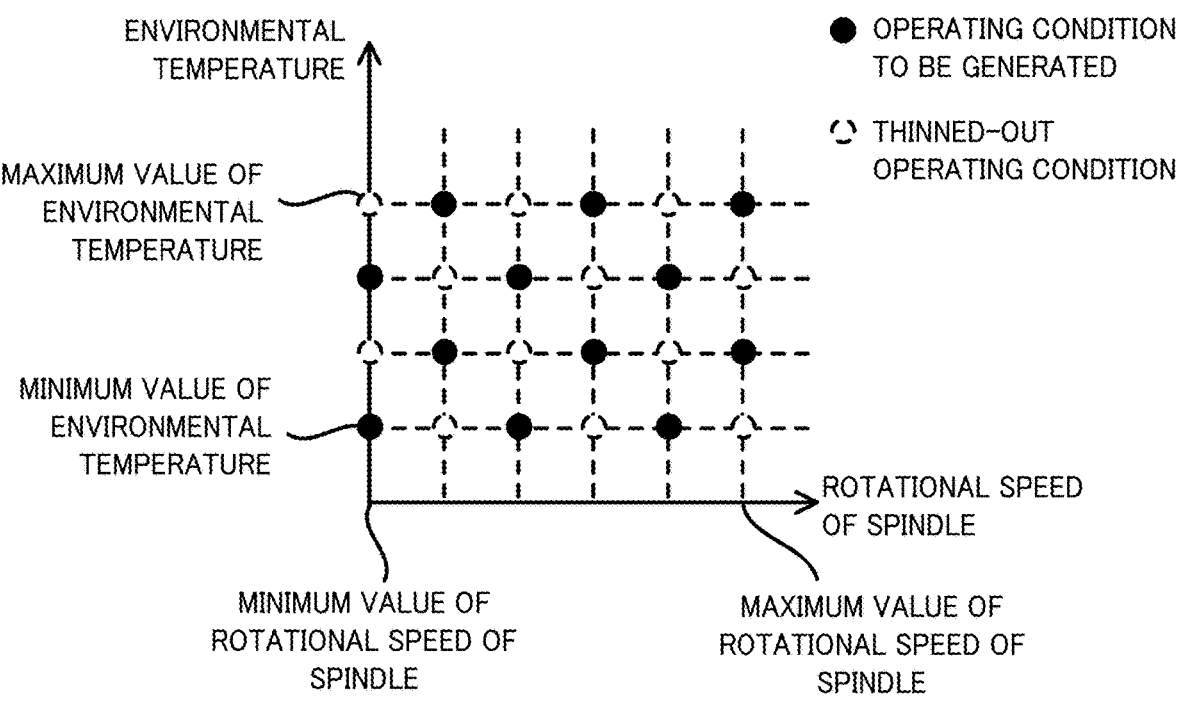
FIG. 6 illustrates still another method for generating the operating conditions conducted by the operating condition generating unit.

The data collection plan generating unit 135 may thin out the operating conditions if the number of operating conditions included in a data collection plan to be generated exceeds the limit of the number of operations extracted by the constrain condition extracting unit 110. For example, as shown in FIG. 6, the operating conditions may be thinned out uniformly, or may be thinned out such that the operating conditions will be distributed uniformly according to the predetermined rules.

Figure 7:
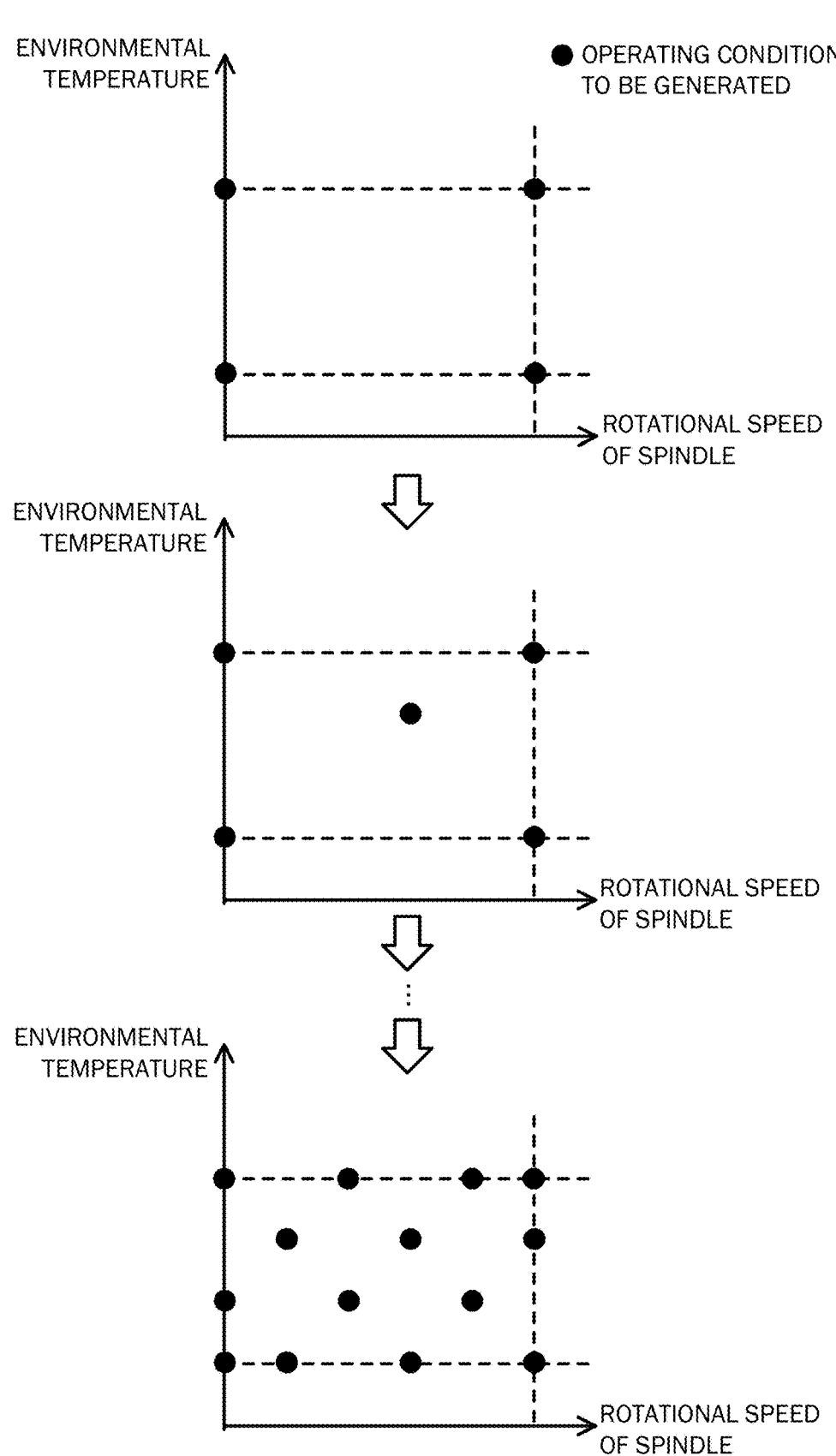
FIG. 7 illustrates yet another method for generating the operating conditions conducted by the operating condition generating unit.

Contrary to the above example, the data collection plan generating unit 135 may iteratively generate the operating conditions within the limit of the number of operations extracted by the constrain condition extracting unit 110. For example, as illustrated in FIG. 7, following the generation of a set of the minimum value and the maximum value of each parameter as an operating condition, the generating unit 135 may select a point on the vector space of the parameter with lowest density of the operating conditions to thereby iteratively repeat the process of generating a set of values of the position of the point as operating conditions. In this case, the density of the operating conditions may vary depending on an axis on the vector space. By lowering the density of an axis of a parameter a value change of which has little influence on a result of machine learning, it is possible to avoid unnecessary increase in the number of the operating conditions. By selecting in this way, it is possible to generate a set of parameter values with any number of operations that can be distributed uniformly over the vector space of the parameter.

The data collection plan generated by the data collection plan generating unit 135 is stored in the data collection plan storage unit 210. The data collection plan stored in the data collection plan storage unit 210 may be displayed on the display device 70 through the output unit 140. The output unit 140 may be configured to conduct display output to the display device 70, as well as conducting an output process on the external device 72, an output process via the network 5 and so on. In this case, the data collection plan stored in the data collection plan storage unit 210 can be used by storing it in an external storage device, not shown, via the external device 72, or can be used by transmitting it to the control device 3, or a fog computing system or cloud server, not shown, via a network.

The data collection plan generating device 1 according to the illustrative embodiment having the above-described configuration can be used to allow an operator to generate a data collection plan suitable for collecting appropriate data from general setting values such as functions and a specification of a machine.

The above embodiment is one example of the present invention, and thus the present invention is not limited thereto. The present invention can be implemented in various ways by modifying the embodiment appropriately.

For example, in the above-described embodiment, the data collection plan generating device 1 generates the operating conditions based on the specification and the constrain conditions of the machine, but specifications and constrain conditions to be used by the data collection plan generating device 1 are not limited to the specification and the constrain conditions of the machine. For example, the specifications and the constrain conditions of components of a system consisting of a plurality of machines and devices, such as production system or experiment system, may be used to generate the operating conditions of this system. Even in this case, the functions of the data collection plan generating device 1 of the present application can be used effectively.

REFERENCE SIGNS LIST

1 Data Collection Plan Generating Device
3 Control Device
4 Industrial Machine
5 Network
6 Sensor
11 CPU
12 ROM

13 RAM
14 Non-Volatile Memory
17, 18, 20 Interface
22 Bus
70 Display Device
71 Input Device
72 External Device
100 Specification Setting Unit
110 Constrain Condition Extracting Unit
120 Parameter Selecting Unit
130 Operating Condition Generating Unit
135 Data Collection Plan Generating Unit
140 Output Unit
200 Specification Storage
210 Data Collection Plan Storage
220 Selection Rule Storage

The invention claimed is:

1. A control device for controlling a machine by generating a data collection plan formed of a combination of operating conditions for acquiring data from the machine in operation, the control device comprising:
a processor configured to
set a specification of the machine,
extract a constrain condition associated with an operation of the machine, the constrain condition including a number of operations,
generate a plurality of operating conditions including a set of values of parameters associated with the set specification based on the specification and the constrain condition,
generate a data collection plan from the generated plurality of operating conditions, wherein the processor is configured to
in response to a number of the plurality of operating conditions included in the data collection plan to be generated exceeding a limit of the number of operations included in the extracted constrain condition, further thin out the plurality of operating conditions, and
in response to the number of the plurality of operating conditions included in the data collection plan to be generated being fewer than the limit of the number of operations, further iteratively generate the plurality of operating conditions within the limit of the number of operations; and
correct thermal displacement of the machine, by using machine learning predicting a value for thermal displacement correction based on the generated data collection plan.

2. The control device according to claim 1, wherein the processor is further configured to
select the parameters to be included in the plurality of operating conditions of the machine based on the specification and the constrain condition, and generate the plurality of operating conditions including the set of values of the parameters selected based on the specification and the constrain condition.

3. A data collection plan generating method conducted by a control device for controlling a machine by generating a data collection plan formed of a combination of operating conditions for acquiring data from the machine in operation, the data collection plan generating method comprising:
a specification setting procedure for setting a specification of the machine;
a constrain condition extracting procedure for extracting a constrain condition associated with an operation of the machine, the constrain condition including a number of operations;
an operation condition generating procedure for generating a plurality of operating conditions including a set of values of parameters associated with the specification set in the specification setting procedure based on the specification and the constrain condition;
a data collection plan generating procedure for generating a data collection plan from the plurality of operating conditions generated in the operation condition generating procedure, wherein the data collection plan generating method includes
in response to a number of the plurality of operating conditions included in the data collection plan to be generated exceeding a limit of the number of operations included in the extracted constrain condition, further thinning out the plurality of operating conditions, and
in response to the number of the plurality of operating conditions included in the data collection plan to be generated being fewer than the limit of the number of operations, further iteratively generating the plurality of operating conditions within the limit of the number of operations; and
a procedure for correcting thermal displacement of the machine by using machine learning predicting a value for thermal displacement correction based on the generated data collection plan.

4. The data collection plan generating method according to claim 3, wherein
after the constrain condition extracting procedure, a parameter selecting procedure is further conducted to select the parameters to be included in the plurality of operating conditions of the machine based on the specification and the constrain conditions, and
the operating condition generating procedure is conducted to generate the plurality of operating conditions including the set of values of the parameters selected in the parameter selecting procedure based on the specification and the constrain conditions.

* * * * *